United States Patent
Ouellette et al.

(10) Patent No.: US 7,128,789 B2
(45) Date of Patent: *Oct. 31, 2006

(54) SURFACE BONDED ENTANGLED FIBROUS WEB AND METHOD OF MAKING AND USING

(75) Inventors: William Robert Ouellette, Cincinnati, OH (US); Robert Allan Johnson, Turnersville, NJ (US); Bruce Neil Hall, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 246 days.

This patent is subject to a terminal disclaimer.

(21) Appl. No.: 10/390,214

(22) Filed: Mar. 17, 2003

(65) Prior Publication Data

US 2003/0168153 A1    Sep. 11, 2003

Related U.S. Application Data (62) Division of application No. 09/642,904, filed on Aug. 21, 2000, now Pat. No. 6,534,174.

(51) Int. Cl.
*B06B 7/00* (2006.01)
(52) U.S. Cl. .............................. 134/6; 134/42; 426/106
(58) Field of Classification Search ............. 156/308.2, 156/296, 148; 134/6, 42; 426/106
See application file for complete search history.

(56) References Cited

U.S. PATENT DOCUMENTS

| | | | |
|---|---|---|---|
| 2,451,915 A | 10/1948 | Buresh | |
| 2,700,188 A | 1/1955 | Buresh et al. | |
| 2,703,441 A | 3/1955 | Langdon et al. | |
| 2,890,497 A | 6/1959 | Langdon et al. | |
| 3,117,875 A | 1/1964 | Burns et al. | |
| 3,209,978 A | 10/1965 | Dupuis | |
| 3,286,007 A | 11/1966 | Wilkie et al. | |
| 3,332,920 A | 7/1967 | Clark et al. | |
| 3,415,662 A | 12/1968 | Koger et al. | |
| 3,424,596 A | 1/1969 | Sullivan | |
| 3,485,706 A | 12/1969 | Evans | |
| 3,485,709 A | 12/1969 | Evans et al. | |
| 3,493,462 A | 2/1970 | Bunting, Jr. et al. | |
| 3,511,436 A | 5/1970 | Kessler | |
| 3,535,178 A * | 10/1970 | Parlin et al. ................... | 156/72 |
| 3,613,554 A | 10/1971 | Koger et al. | |

(Continued)

FOREIGN PATENT DOCUMENTS

DE        262 143 A3    11/1988

(Continued)

OTHER PUBLICATIONS

Phifer, Daniel A., & Costello, Carol A., Characterization of Polypropylene and Polyester Meltblown Materials Used for Food Oil Absorption, Journal of Food Science, 1992, pp. 213-216, vol. 57, No. 1.

(Continued)

*Primary Examiner*—Jeff H. Aftergut
(74) *Attorney, Agent, or Firm*—Leonard W. Lewis (57) ABSTRACT

An absorbent, low-linting fibrous structure comprising an entangled web of synthetic fibers, wherein fibers of at least one of said top surface and said bottom surface are surface bonded, such as by thermal or adhesive bonding. The web is absorbent, has low density, is resistant to linting, and can retain structural integrity at high temperatures. The structure can be made by forming a web of synthetic fibers, entangling the fibers of the web, such as by needling or hydroentangling, and bonding the fibers at the surface of the web by thermal or adhesive bonding.

10 Claims, 2 Drawing Sheets

U.S. PATENT DOCUMENTS

| | | |
|---|---|---|
| 3,616,157 A | 10/1971 | Smith |
| 3,675,391 A | 7/1972 | Gallacher |
| 3,751,629 A | 8/1973 | Eisler |
| 3,764,527 A | 10/1973 | Sohl |
| 3,797,074 A | 3/1974 | Zafiroglu |
| 3,841,953 A | 10/1974 | Lohkamp et al. |
| 3,849,241 A | 11/1974 | Butin et al. |
| 3,862,963 A | 1/1975 | Hoshi et al. |
| 3,865,302 A | 2/1975 | Kane |
| 3,881,211 A | 5/1975 | Rhodes |
| 3,895,151 A * | 7/1975 | Matthews et al. ........ 428/102 |
| 3,916,030 A | 10/1975 | Bard et al. |
| 3,972,759 A | 8/1976 | Buntin |
| 3,978,185 A | 8/1976 | Buntin et al. |
| 3,985,990 A | 10/1976 | Levinson |
| 4,013,798 A | 3/1977 | Goltsos |
| 4,015,085 A | 3/1977 | Woods |
| 4,042,740 A | 8/1977 | Krueger |
| 4,103,058 A | 7/1978 | Humlicek |
| 4,137,333 A | 1/1979 | Daswick |
| 4,141,487 A | 2/1979 | Faust et al. |
| 4,190,757 A | 2/1980 | Turpin et al. |
| 4,198,461 A | 4/1980 | Keller et al. |
| 4,210,674 A | 7/1980 | Mitchell |
| 4,230,924 A | 10/1980 | Brastad et al. |
| 4,261,504 A | 4/1981 | Cowan |
| 4,275,811 A | 6/1981 | Miller |
| 4,288,584 A | 9/1981 | Mishra |
| 4,292,332 A | 9/1981 | McHam |
| 4,332,762 A | 6/1982 | Lynch |
| 4,358,466 A | 11/1982 | Stevenson |
| 4,390,554 A | 6/1983 | Levinson |
| 4,403,069 A | 9/1983 | Keller et al. |
| 4,404,241 A | 9/1983 | Mueller et al. |
| 4,419,373 A | 12/1983 | Oppermann |
| 4,426,417 A | 1/1984 | Meitner et al. |
| 4,427,706 A | 1/1984 | El-Hag |
| 4,436,780 A | 3/1984 | Hotchkiss et al. |
| 4,443,512 A | 4/1984 | Delvaux |
| 4,443,513 A | 4/1984 | Meitner et al. |
| 4,451,314 A | 5/1984 | Knoke et al. |
| 4,463,121 A | 7/1984 | Gartland et al. |
| 4,493,868 A | 1/1985 | Meitner |
| 4,547,420 A | 10/1985 | Krueger et al. |
| 4,551,377 A | 11/1985 | Elves et al. |
| 4,571,337 A | 2/1986 | Cage et al. |
| 4,572,852 A | 2/1986 | Gartland et al. |
| 4,582,666 A | 4/1986 | Kenworthy et al. |
| 4,587,154 A | 5/1986 | Hotchkiss et al. |
| 4,590,349 A | 5/1986 | Brown et al. |
| 4,592,943 A | 6/1986 | Cancian et al. |
| 4,609,580 A * | 9/1986 | Rockett et al. .......... 428/198 |
| 4,637,919 A | 1/1987 | Ryder et al. |
| 4,640,838 A | 2/1987 | Isakson et al. |
| 4,657,804 A | 4/1987 | Mays et al. |
| 4,681,801 A | 7/1987 | Eian et al. |
| 4,720,410 A | 1/1988 | Lundquist et al. |
| 4,737,394 A | 4/1988 | Zafiroglu |
| 4,740,377 A | 4/1988 | Dawes et al. |
| 4,748,069 A | 5/1988 | Cullen |
| 4,795,668 A | 1/1989 | Krueger et al. |
| 4,810,315 A | 3/1989 | Zufang et al. |
| 4,818,315 A * | 4/1989 | Hellgren et al. ........ 156/62.2 |
| 4,828,911 A | 5/1989 | Morman |
| 4,851,273 A | 7/1989 | Brown |
| 4,857,342 A | 8/1989 | Kappes |
| 4,865,854 A | 9/1989 | Larson |
| 4,873,101 A | 10/1989 | Larson et al. |
| 4,883,707 A | 11/1989 | Newkirk |
| 4,891,262 A | 1/1990 | Nakamae et al. |
| 4,902,564 A | 2/1990 | Israel et al. |
| 4,935,276 A | 6/1990 | Pawlowski et al. |
| 5,041,325 A | 8/1991 | Larson et al. |
| 5,047,347 A | 9/1991 | Cline |
| 5,093,176 A | 3/1992 | Pribonic et al. |
| 5,094,869 A | 3/1992 | Brown, Jr. |
| 5,096,722 A * | 3/1992 | Bair .......................... 426/107 |
| 5,097,756 A | 3/1992 | Nolte |
| 5,114,774 A * | 5/1992 | Maxim, Jr. ................ 428/101 |
| 5,156,743 A * | 10/1992 | Muncrief .................... 210/671 |
| 5,198,057 A | 3/1993 | Newkirk et al. |
| 5,202,185 A | 4/1993 | Samuelson |
| 5,240,764 A | 8/1993 | Haid et al. |
| 5,260,013 A | 11/1993 | Samuelson |
| 5,284,704 A | 2/1994 | Kochesky et al. |
| 5,375,306 A * | 12/1994 | Roussin-Moynier ........ 28/104 |
| 5,387,383 A | 2/1995 | Collier et al. |
| 5,414,248 A | 5/1995 | Phillips |
| 5,532,035 A * | 7/1996 | Corbin et al. ................ 428/95 |
| 5,552,169 A | 9/1996 | Kannankeril et al. |
| 5,595,711 A | 1/1997 | Wilson et al. |
| 5,607,766 A | 3/1997 | Berger |
| 5,620,641 A | 4/1997 | Berger |
| 5,633,082 A | 5/1997 | Berger |
| 5,639,541 A * | 6/1997 | Adam ....................... 428/198 |
| 5,643,662 A | 7/1997 | Yeo et al. |
| 5,693,420 A | 12/1997 | Terada et al. |
| 5,705,119 A | 1/1998 | Takeuchi et al. |
| 5,707,735 A | 1/1998 | Midkiff et al. |
| 5,744,406 A | 4/1998 | Novak |
| 5,766,660 A | 6/1998 | Lee et al. |
| 6,110,293 A | 8/2000 | Honeycutt et al. |
| 6,534,174 B1 | 3/2003 | Ouellette et al. |
| 6,673,158 B1 * | 1/2004 | Ouellette et al. .............. 134/6 |

FOREIGN PATENT DOCUMENTS

| | | |
|---|---|---|
| EP | 0 070 163 A2 | 1/1983 |
| EP | 0 168 225 A2 | 1/1986 |
| EP | 0 171 806 A2 | 2/1986 |
| EP | 0 171 807 A2 | 2/1986 |
| EP | 0 304 825 A2 | 3/1989 |
| EP | 0 321 237 A2 | 6/1989 |
| EP | 0 535 451 | 4/1993 |
| EP | 0 729 735 A1 | 9/1996 |
| GB | 1124482 | 8/1968 |
| GB | 1326915 | 8/1973 |
| GB | 2319265 | 5/1998 |
| JP | 63-264915 | 1/1988 |
| JP | 03014694 A | 1/1991 |
| JP | 7070912 | 3/1995 |
| JP | 09192030 | 7/1997 |
| JP | 09-256255 A * | 9/1997 |
| JP | 11 276361 A2 | 10/1999 |
| WO | WO 90/04066 A | 4/1990 |
| WO | WO 93/22486 A1 | 11/1993 |
| WO | WO 99/00098 A1 | 1/1999 |
| WO | WO 99/16946 A1 | 4/1999 |
| WO | WO 00/49893 A1 | 8/2000 |
| WO | WO 01/29301 A1 | 4/2001 |

OTHER PUBLICATIONS

Grewal, Randeep S., & Banks, Dr. Pamela, Development of Thermal Insulation for Textile Wet Processing Machinery Using Needlepunched Nonwoven Fabrics, Published in INJ fall, 1999, pp. 61-66.

Bisson, Marie-Claude, LaBonne Cuisine Francaise, Edition Du Club France Loisirs, Sep. 1985, p. 93, col. 1, lines 5-12, Paris, France.

U.S. Appl. No. 09/255,420, filed Feb. 22, 1999, Ouellette et al, abandoned.

U.S. Appl. No. 09/510,164, filed Feb. 22, 2000, Ouellette et al.

U.S. Appl. No. 09/642,681, filed Aug. 21, 2000, Ouellette et al.

* cited by examiner

SURFACE BONDED ENTANGLED FIBROUS WEB AND METHOD OF MAKING AND USING

This application is a divisional of U.S. application Ser. No. 09/642,904, filed Aug. 21, 2000, now U.S. Pat. No. 6,534,174, which is hereby incorporated by reference in its entirety.

FIELD OF THE INVENTION

The present invention relates to an absorbent web of fibers having high absorbency and low linting. This invention further relates to absorbent webs of entangled synthetic fibers, wherein fibers at the surface of the web are surface bonded, such as by thermal or adhesive bonding. The present invention further relates to methods for making and using such webs.

BACKGROUND OF THE INVENTION

Fibrous webs for absorbing a wide variety of liquids are widely used for a variety of purposes. Fibrous webs are made from a plurality of individual fibers which are bonded to one another to provide the web some degree of structural integrity, so that it can retain its shape during manufacture, handling, and/or use. Void volume within the web provides capacity for absorbing and retaining liquids. One of the disadvantages of fibrous webs is that individual fibers incorporated into the web, especially at the surface of the web, can become loose and separate from the web. This is referred to as linting.

In many applications, the web is enclosed within a confined volume by one or more liquid permeable sheets. For example, diapers have an absorbent web enclosed within a nonpermeable backsheet layer and a liquid permeable topsheet layer. The topsheet and backsheets contain any lint that may separate from the web. The fibers of some webs are bonded to one another to reduce linting.

One method of bonding the fibers is to thermally bond them together with polymeric bonding materials, such as but not limited to polypropylene, polyethylene, and other polyolefins. Other bonding technologies frequently used include adhesive agents and polymeric resins. Still other webs are made from polymeric fibers which, when heated to a high enough temperature, become partially molten or flowable. When the web is cooled, those synthetic fibers in sufficient proximity to one another to cause the molten polymer for adjacent polymers to contact one another become thermally bonded as temperature falls below the melting or glass transition point of the polymer. A disadvantage of these types of bonding methods is that the bonding agents added to the web can adversely affect absorbency and softness of the web. Another disadvantage of thermally bonded webs is that they do not retain structural integrity at temperatures above the melting temperature or glass transition temperature of the polymer used to thermally bond the fibers. Thus, webs relying upon thermal bonding to control lint would not be useful for applications in which they are exposed to high temperatures, such as when used as heat insulators, for example in a pot holder or for industrial or construction purposes. Another application wherein the webs may be exposed to high temperatures is absorption of oils from food during cooking. If stable at temperature, such webs may be contacted with foods during cooking, or even intermixed in the food, to absorb fats and oils. Typical temperatures experience during stove-top cooking, for example, can range from about 120 C to about 175 C.

Another method of bonding fibers together is known as entangling. Entangling the fibers entails mechanical interlocking of the fibers to one another. One commonly known method for entanglement is needling (also referred to as felting), wherein a barbed needle is inserted into the web and then removed, causing entanglement at the point of insertion. Another method of entanglement is hydroentanglement, wherein narrow jets of water are directed at the web to cause the fibers to become entangled. Although needling can introduce significant improvements in structural integrity to the web, such webs having high levels of absorbency typically suffer from relatively high levels of lint. When entanglement is increased sufficiently to reduce lint, the web typically suffers from reduced absorbency. It is also known to thermally bond synthetic fibers of non-woven webs by calendar rolls or other compressive means, such as is in the manufacture of inexpensive non-woven fabrics used to make disposable clothing, e.g., surgical gowns. These types of materials are generally thin and would have poor absorbency.

British Patent 1,124,482, granted Sep. 21, 1965, Ludlow Corporation, discloses a process for manufacturing polyolefin fiber-containing non-woven fabric in which one surface is heated to fuse the thermoplastic fibers. A thermo-responsive resin then added to the web melted by hot air. This product would not have good high temperature stability once exposed to a high enough temperature to melt the thermoresponsive resin.

U.S. Pat. No. 4,810,315, issued Mar. 7, 1989, A. A. Zufang and R. A. M. J. Fabrie, discloses a method for making a web of plastic material having a base layer of plastic fibers which are heat treated at one surface. A second layer of plastic material, having a higher plasticizing temperature than the base layer, is then laminated to the heated surface of the base layer. The resulting web is said to retain porosity. However the lamination process described therein would not reduce Tinting of the resulting product, particularly at the exterior surfaces of the product.

It is an object of this invention to provide fibrous webs that are both absorbent and have low levels lint.

It is a further object of this invention to provide fibrous webs that are absorbent and retain structural integrity upon exposure to relatively high temperatures during use.

It is yet another object of this invention to provide fibrous webs that are absorbent, have low levels of lint, and retain structural integrity upon exposure to relatively high temperatures during use.

It is still another object of this invention to provide a method for making fibrous webs that meet the above objects.

It is yet another object of this invention to provide methods of using such fibrous webs.

These and other object and benefits of the invention may become apparent to those of ordinary skill in the art may be achieved as a result of the invention as described in the specification and defined in the claims which follow.

All percentages are by weight of the total composition or product unless otherwise indicated. All averages are weight averages unless otherwise indicated. All products or processes that comprise one or more elements disclosed or claimed herein may alternately consist of or consist essentially of any elements disclosed or claimed herein.

SUMMARY OF THE INVENTION

The present invention provides in one embodiment hereof an absorbent, low-linting fibrous structure comprising an entangled web of synthetic fibers, wherein fibers of at least one of said top surface and said bottom surface are surface bonded, such as by thermal or adhesive bonding. The web is absorbent, has low density, is resistant to linting, and can retain structural integrity at high temperatures. The structure can be made by forming a web of synthetic fibers, entangling the fibers of the web, such as by needling or hydroentangling, and bonding the fibers at the surface of the web by thermal or adhesive bonding.

In another embodiment, the present invention provides an absorbent fibrous structure comprising a web of synthetic fibers, said web having a top surface and a bottom surface, wherein fibers of at least one of said top surface and said bottom surface are surface bonded and said web has an Ambient Temperature (22 C) Oil Absorbency of at least about 7 g/g.

In another embodiment, the present invention provides an absorbent fibrous structure comprising a web of synthetic fibers, wherein web has an Ambient Temperature (22 C) Oil Absorbency of at least about 7 g/g and a Linting Value of about 3.3 mg/cm$^2$ or less.

BRIEF DESCRIPTION OF THE DRAWINGS

While the specification concludes with claims particularly pointing out and distinctly claiming the present invention, it is believed that the present invention will be better understood from the following description in conjunction with the accompanying drawings in which like reference numerals identify identical elements and wherein:

DETAILED DESCRIPTION OF THE INVENTION

The present invention provides absorbent structures comprising a web of synthetic fibers that is has low linting on at least one surface, is highly absorbent, and can retain structural integrity at elevated temperature. The webs of the present invention are entangled webs. By "entangled web" what is meant is that the fibers of the web are mechanically bonded to each other due to the individual fibers interlocking, i.e., "entangling" with one another. At least one surface of the web, preferably both top and bottom surfaces, are "glaze" or "surface" bonded, as defined herein. It has been found that surface bonding at the surface of the web can significantly reduce linting, while allowing the web to retain excellent absorbency and maintain relatively low density and softness. Such surface bonding also enables lower density webs to be provided which have high absorbency normally attributable to low density, in combination with low levels of lint normally attributable to more highly entangled, higher density webs.

Typically, in conventional thermally-bonded webs, the melted material of the fibers or other thermal bonding agent flows into the interstitial void spaces to form bond sites, thereby reducing both the number and size of the interstitial void spaces between the fibers. This reduces the available free surface area on the fiber surfaces for absorbing liquids. The size of the interstitial void spaces may be further reduced by fabric compaction in and adjacent to bond sites during calendar roll thermal bonding. The present invention avoids these problems by entangling to form a low density web, and thermally or adhesively bonding the surface(s), thereby minimizing the degree of thermal or adhesive bonding throughout the entire thickness of the web necessary to minimize linting.

In particular, the preferred absorbent fibrous structure of the present invention comprises an entangled web of synthetic fibers, the web having a top surface and a bottom surface, wherein at least one of said top surface and said bottom surface are surface bonded. Preferably both the top and bottom surfaces are surface bonded. Preferably the surface bonded surface or surfaces are thermally bonded. Thermal bonding can be accomplished by heating the fibers of the web at the surface to a temperature above the Tg or Tm of fiber material and then cooling the material while adjacent fibers are in contact with one another. Surface bonding can also be achieved by chemical bonding, e.g. with adhesives, such as but not limited to hot melt adhesives (e.g., such as are available from Hysol, Inc. hot melt adhesive numbers 6009 and 7480). Surface bonding as defined herein does not mean bonding by mechanical entanglement of the fibers or hydrogen bonding. Thus, fibers at the surface of the webs of the present invention may be bonded by entanglement and are further "surface" bonded (e.g., thermal or chemical bonding, but not including hydrogen bonding). Additionally, one or more edges of the web may be surface bonded.

By surface bonding of the surfaces or edges, what is meant is that bonding occurs at the surface of the web, however a center region of the web remains unbonded (other than by mechanical entanglement and hydrogen bonding) or is bonded to a lesser extent compared to the surface. Preferably surface bonding occurs to a depth less than the thickness of the web, more preferably to a depth less than one-half the thickness of the web, such that that center of the web is not surface bonded even when both top and bottom surfaces of the web are surface bonded. Preferably a relatively thin layer of the web structure is bonded by surface bonding. In the event that some surface bonding does extend through the entire thickness of the web, the degree of bonding should be low enough such that the web retains both good absorbency and low density. In such instances of thermal bonding through the entire thickness, there will preferably be a gradient in the degree of thermal bonding through the thickness of the web with a higher degree of bonding at the surfaces and/or edges in relation to the interior volume of the web.

The fibrous web of the present invention is nonwoven. The nonwoven web may be made by any of a number of techniques common in the art including, but not limited to; carding, spunbonding, air laying, and wet laying. The web may also comprise one ply, or layer, or a plurality of plies. A combination of plies made by different nonwoven web manufacturing techniques may also be used. Multi-ply webs may be laminated or non-laminated. Preferably, the web structure is made by carding or is spunbonding, most preferably carding.

The webs of the present invention comprise a plurality of synthetic fibers, preferably polymeric fibers. Fiber lengths are preferably at least about 2 cm, more preferably at least about 2.5 cm, more preferably at least about 3.75 cm. Although there is not necessarily an upper limit to fiber length, preferably fiber length will be about 10 cm or less, more preferably about 8 cm or less, and most preferably about 5.5 cm or less.

The synthetic fibers may be made from any polymers known in the art, including homopolymers as well as copolymer made from two or more monomers. The fibers may also be made from a single polymer species or from a blends of polymers. The fibers may further include any common additives which are safe and effective for their intended purpose and for the intended purpose of the fibrous web, including but not limited to surfactants (especially blooming surfactants incorporated into the polymer melt during formation and surfactants applied to the surface of the formed polymeric fiber).

Suitable polymers include, but are not limited to: polyolefins, such as polypropylene (PP), polyethylene (PE), poly 4-methylpentene (PMP), and polyethylene terephthalate (PET); polyamides, e.g. nylon; cellulosic derived polymers such as regenerated cellulose and rayon; polyesters, or combinations and/or blends thereof. Preferred polymers include PP, PE, and PET.

The polymer or polymers used that are used desirably retain structural integrity at temperatures above the intended temperature conditions during use. Polymers which are amorphous in nature can be described in terms of their glass transition point (Tg). Polymers which are crystalline in nature can be described in terms of their melting point (Tm). Preferably the polymers used will have a Tg or Tm of at least about 120 C, more preferably at least about 175 C, more preferably at least about 200 C.

Figure 3:
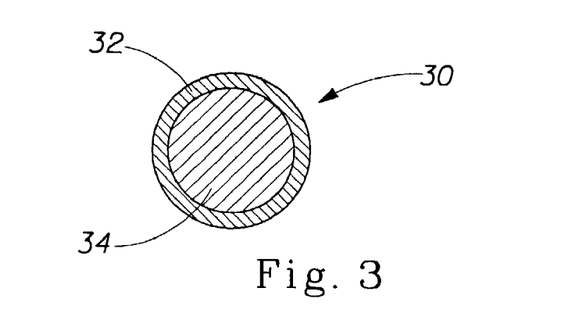
FIG. 3 is a cross-sectional view of a bi-component fiber useful in the webs of the present invention.

Bicomponent fibers may also be used in the present invention. The term "bicomponent" as used herein refers to fibers having at least two discrete structural portions of a fiber. The two discrete structural portions will generally be made of different polymeric compositions. While a wide variety of bicomponent fibers can be used, including without limitation concentric fibers, sometimes known as sheath-core fibers, and eccentric fibers, sometimes known as biased fibers, the preferred bicomponent fibers are concentric, or "sheath-core", fibers, such as shown in FIG. 3, wherein the cross-section of the fiber 30 shows a sheath 32 concentrically surrounding a core 34. In biased component fibers, a substantial portion of two or more components are disposed with exterior surfaces adjacent the atmosphere. For purposes hereof, sheath-core fibers are considered to include any fibers wherein the exterior surface area of the core is at least 90% encompassed by the sheath.

In a preferred embodiment that is especially useful for absorbent oil absorbing webs exposed to high temperatures during use, bicomponent fibers are used having an oleophilic sheath and a higher Tg or Tm, but typically (though not necessarily) more hydrophilic, core. These fibers can provide improved combinations of oil absorbency and high temperature stability than otherwise achievable. Such fibers are described in U.S. patent application Ser. No. 09/510,164, filed Feb. 22, 2000 by Ouellette et al., incorporated herein by reference.

The sheath material, for example, may comprise polyolefins such as polypropylene (PP), polyethylene (PE), poly 4-methylpentene (PMP), or blends thereof, preferably polypropylene (PP) or a blend of polypropylene (PP) and poly 4-methylpentene (PMP).

The core material is capable of being formed into a fiber and have sufficient heat stability to maintain web integrity up to at least about 120 degrees C., more preferably 175 degrees C., and even more preferably at least up to about 200 degrees C. This material may include, but is not limited to: polyester, nylon, polyethylene terephthalate (PET), rayon, regenerated cellulose, or combinations and/or blends thereof. Preferably, the core material is polyethylene terephthalate (PET).

In sheath-core bicomponent fibers, the sheath preferably comprises from about 10% to about 75%, by weight of the fiber, and the core preferably comprises from about 25% to about 90% by weight of the fiber. In one embodiment, the sheath is comprised of polypropylene (PP) and the core is composed of polyethylene terephthalate (PET), and the weight ratio of sheath to core is about 1 to 1. In another embodiment, the sheath is at least about 25% to 75%, more preferably at least about 40% to about 60%, polypropylene (PP), and the core is at least about 25% to 75%, more preferably at least about 40% to about 60% polyethylene terephthalate (PET). In an alternative embodiment of the present invention, the sheath comprises about 10% to about 30%, more preferably about 15% to about 20%, of the fiber weight. The sheath is a blend of at least about 25% to 75%, more preferably at least about 40% to about 60%, polypropylene (PP), and at least about 25% to 75%, more preferably at least about 40% to about 60%, poly 4-methylpentene (PMP), by weight of the sheath. The core comprises about 70% to about 90%, more preferably about 80% to about 85%, of the fiber weight. Biased, or eccentric, bicomponent fibers made from a combination of polymers, as described above, may also be used in the present invention, i.e., bicomponent fibers having a first, oleophilic ply and a second, higher Tg or Tm, but typically (though not necessarily) more hydrophilic, ply. Preferably surface area exposed to the ambient environment of the first ply is in the range of from greater than 10% to up to but not including 90% of the total surface area of the fiber, more preferably from about 50% to up to but not including 90%.

Bicomponent fibers suitable for use in the present invention may be obtained from Fiber Innovation Technology, Inc., Johnson City, Tenn., USA.

The nonwoven web may be entangled, or mechanically interlocked, by any number of techniques common in the art including, but not limited to: needling (alternately known as felting), hydroentangling, or other non-melt bonding/non-adhesive techniques, or combinations thereof. Preferably, the fibers are entangled by either hydroentangling or needling, most preferably needling. Also preferably, the web is cross lapped subsequent to web formation and prior to entangling. Cross lapping can be used to increase basis weight and caliper of the web, and is especially preferred for nonwoven webs (such as but not limited to carded webs and wet laid webs) which are relatively weak in one planar direction, e.g., weaker in the cross direction relative to the machine direction. Cross lapping can also improve uniformity of the caliper and basis weight of the web. A preferred technique for making cross lapped webs is festooning. Methods for cross lapping and festooning as used herein are well known to those in the art.

Figure 1:
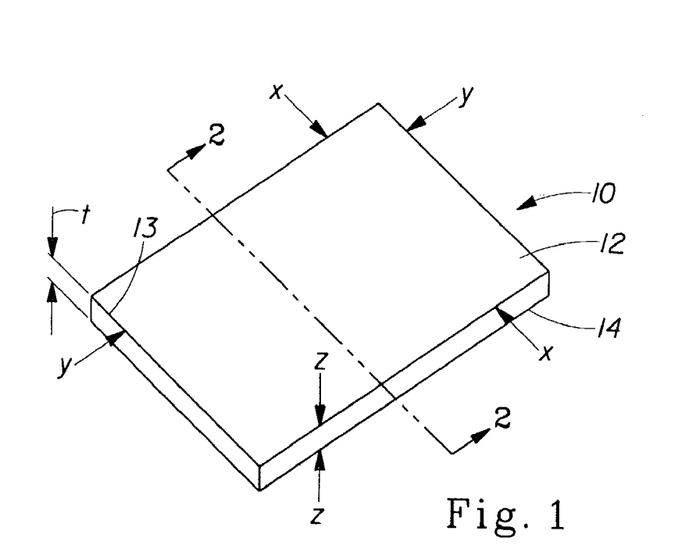
FIG. 1 is a perspective view of an absorbent web according to the present invention.
Figure 2:
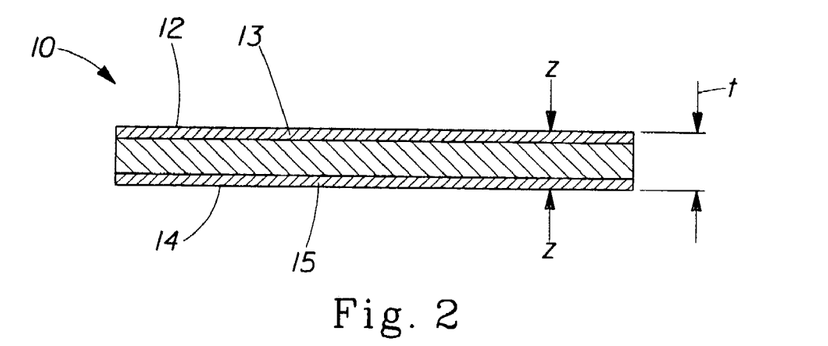
FIG. 2 is a cross-sectional view of the web of FIG. 1.

The fibers are preferably entangled by application of entangling force applied in the direction that is normal to the plane of the web to maximize void space, that is, the z direction as shown in FIGS. 1 and 2.

The web is then thermally bonded at least at one surface of the web, preferably at both the top surface and the bottom surface, and optionally at one or more edges of the web. Preferably thermal bonding is accomplished by melt bonding of the fibers at about, or above, the Tg or Tm, as may be applicable, of the polymeric material of the fiber. With respect to bicomponent fibers, the minimum thermal bonding temperature will correspond to about the Tg or Tm of the polymeric material with the lowest Tg or Tm. It is preferred to thermally seal the surfaces of the web at the lowest temperature practicable in order to maximize absorbent capacity of the web. Preferably, the thermal bonding temperature is no more than about 25 C, more preferably no more than about 10 C, more preferably no more than about 5 C, most preferably no more than about 2 C above the Tg or Tm, the lowest of which may be applicable, of the lowest melting or glass transitioning exterior component of the fiber. Thermal bonding also should preferably be applied using the least pressure applied to the web as necessary in order to thermally bond the surface. Preferably the heat rolls or belts used do not substantially compress the web during processing.

The preferred polymeric materials for thermal bonding will have a Tg or Tm, as may be applicable, of at least about 120 C, more preferably at least about 140 C, most preferably at least about 150 C, most preferably at least about 160 C (e.g., PET's having Tm of 240–260 C and PP's with Tm of about 160 C).

It has been found that the combination of thermal bonding at the web surface with entangling can provide surprisingly high absorbency in combination with low levels of linting. Preferably, entanglement forces normal to the plane of the web are applied with high needling frequency on a unit area basis. For needling processes, the needling frequency is preferably at least about 150 needle strokes/cm$^2$, more preferably at least about 180 needle strokes/cm$^2$, more preferably at least about 200 needle strokes/cm$^2$, most preferably at least about 215 needle strokes/cm$^2$. Needling penetration (the distance by which the tip of the needle penetrates through entire thickness of the web and beyond the edge of the far surface of the web, measured from the surface opposite of where the needle is inserted) can be adjusted by those of ordinary skill in the art and will depend upon the starting density, basis weight, and caliper, as well as the desired post-needling density, basis weight, and caliper, and the type of needle used. It has been found that surprisingly low needle penetration distances through the web, in combination with high stroke density, can provide surprisingly low Tinting values while retaining good absorbency and overall web integrity when combined with surface bonding. Exemplary needling processes are disclosed in U.S. Pat. No. 3,859,698, issued Jan. 14, 1975 to M. Okamoto et al., incorporated in its entirety herein.

Needling is preferably applied to both the top and bottom surfaces of the web. Especially preferred is to apply needling to one surface of the web in a first stage of entanglement referred to as a tacking stage, e.g. the top surface, and subsequently apply a second or final stage of needling to both the top and bottom surfaces.

The absorbent webs of the present invention have relatively low density, in order that they may provide high absorbent capacity, softness, and/or cleaning ability. The density of the present webs is about 100 mg/cm$^3$ or less, preferably about 75 mg/cm$^3$ or less, more preferably about 50 mg/cm$^3$ or less. Minimum density is governed primarily by practical limitations, however the density will preferably be at least about 10 mg/cm$^3$, more preferably at least about 25 mg/cm$^3$, most preferably at least about 40 mg/cm$^3$.

Thickness of the webs of the present invention can vary widely. In general, the webs will be at least about 2 mm thick (in the z direction). Single ply layers or webs will typically be up to about 50 mm due to practical considerations, however it is not meant to necessarily limit the present invention to such upper or lower limit. Preferably the webs of the present invention will be from about 2 mm to about 10 m thick, more preferably from about 2.5 mm to about 5 mm thick. It is also contemplated to layer several plies of web and, prior to or subsequent to layering, thermally bond the outermost top and/or bottom surfaces of the multi-ply web. Basis weight of the webs of the present invention is preferably from about 100 g/m$^2$ to about 500 g/m$^2$, more preferably from about 125 g/m$^2$ to about 250 g/m$^2$, most preferably from about 150 g/m$^2$ to about 185 g/m$^2$.

The webs of the present invention also preferably are highly absorbent, especially oil absorbent. Oil absorbency can be measured according to the Oil Absorbency Test described below in the Test methods section. Oil absorbency will depend on factors that including but not limited to, polymer selection, fiber shape and length, degree of thermal bonding, degree and conditions of fiber entanglement, and web density. The webs will preferably have an Oil Absorbency, as measured according to the test below, at ambient temperatures (22 C), hereinafter referred to as the Ambient Temperature Oil Absorbency, or at least about 7 g/g, preferably at least about 10 g/g, more preferably at least about 12 g/g, most preferably at least about 15 g/g. Also preferably, the absorbent web will be made from fibers having sufficient oleophilicity and high temperature stability such that the Oil Absorbency at the elevated temperature of 120 C, hereinafter the High Temperature (120 C) Oil Absorbency is at least about 6 g/g, preferably at least about 9 g/g, more preferably at least about 11 g/g, most preferably at least about 13 g/g.

Fibrous webs intended for use in aqueous environments, to absorb aqueous based liquids, will preferably have water absorbency at 22 C (distilled water) values determined by test for Ambient Temperature Oil Absorbency except substituting water for oil (hereinafter the Ambient Temperature Water Absorbency), of at least about 7 g/g, preferably at least about 10 g/g, more preferably at least about 12 g/g, most preferably at least about 15 g/g. Preferred polymers for the exterior of fibers used in water absorbent webs include those polymers described above for use as the core component of bicomponent fibers. Webs intended to absorb high levels of water are preferably made from hydrophilic fibers comprising such materials as nylon, rayon, regenerated cellulose, or PET. Alternately, less hydrophilic fibers may be used, such as polyolefins as described above, which are treated with surfactants to improve hydrophilicity (e.g., blooming surfactants added to the polymeric melt or surfactants applied to the surface of the fibers).

As previously discussed, the structures of the present invention have low linting, while retaining good absorbency and low density, as a result of the surface thermal bonding of the web. Linting can be measured according to the Linting Value test in the Test Methods section below. The webs will preferably have a Linting Value of about 6.6 mg/cm$^2$ or less, preferably about 5.0 mg/cm$^2$ or less, more preferably about 3.3 mg/cm$^2$ or less, most preferably about 1.0 mg/cm$^2$ or less. Accordingly, surface bonding at the surfaces of the web should preferably be applied to the degree necessary in order reduce linting to at or below the desired level.

The fibrous web may also include a line of weakness, including, but not limited to, a line of perforations, laser scores, or tear-initiating notches, which would facilitate the use of a portion or part of the fibrous web.

The fibrous web of the instant invention can be of various sizes and shapes. It may optionally be wound on a roll and provided in a dispensing package. The web of the present invention can be used by contacting it with oil. In a preferred application it is contact or placed in oil communication with food prior to, during, or subsequent to preparation of the food, including for example cooking of the food. In a preferred application, such as described in U.S. patent application Ser. No. 09/510,164, referred to above and incorporated herein by reference, the fibrous web is used to remove oil, fat, or grease (hereinafter collectively referred to as grease) during and after the preparation of food. An absorbent fibrous web of the instant invention is placed adjacent to food during the cooking of the food, such as, but not limited to, in a frying pan or on top of soups and chilies. During cooking, the absorbent fibrous web preferentially absorbs the grease. After the food is cooked, the absorbent fibrous web is removed and discarded. Also, an absorbent fibrous web of the instant invention may be used to blot excess grease off of foods such as, but not limited to, pizza, pork products (e.g., bacon), beef products, poultry, and including ground meat products of all types (e.g. hamburgers, sausages, etc.). The webs can be used at ambient temperatures, but can also be used at cooking temperatures, and are especially useful at cooking temperatures typically encountered during stovetop, microwave, or oven cooking, e.g. about 65 C to about 250 C.

In general, the method comprises placing the web in oil communication with food. Preparation of food includes, but is not limited to, manipulating, mixing, cooking, heating, or otherwise treating or modifying or handling food. By "oil communication", what is meant is the article is positioned to absorb grease from food before, during or subsequent to preparation. Oil communication can be provided but is not necessarily limited to the following categories: 1) the web is placed in admixture with or in food; 2) the web is placed in direct contact with the surface of food or a part thereof; 3) the web is positioned to come into contact with grease during preparation of food, but is not necessarily in direct contact with the food.

The fibrous web according to the present invention may be admixed with food. For example, the fibrous web may be stirred or swirled around or through the food or the food may be stirred around the web. This method ensures that the web contacts the surface area of the food for maximum absorption. This method is especially useful to absorb grease during cooking of foods such as, but not limited to, ground beef.

The fibrous web may be used in contact with food. Because of the web integrity of the fibrous web of the instant invention, the fibrous web has little or no linting, sticking, pilling or shredding. For example, one method is to contact foods with the web. The foods may be either solids (such as, but not limited to, pizza) or liquids (such as, but not limited to, soups and stews). "Contacting" may include, but is not limited to, padding, blotting, dragging over, or wrapping, etc. Another method is to wrap the food in the fibrous web and squeeze the food slightly to contact even more surface. Another method is to use the fibrous web as a hot pad to transport foods. Because the fibrous web of the instant invention preferably consists of a relatively thick material, the fibrous web may act as a hot pad and at the same time absorbing the grease from the food's surface. For example, the fibrous web can be used to move foods such as, but not limited to, meats or roasts from a baking pan to serving platter. Another method of using the fibrous web includes covering food with the web to keep foods warm longer due the insulation effects of the web while removing surface grease at the same time. Another use for the fibrous web includes wrapping food, such as, but not limited to, leftovers, with the fibrous web to remove grease during storage. Another use includes placing food on top of the fibrous web and allowing the grease to absorb into the web while allowing fluids such as, but not limited to, water or other aqueous liquids to pass through the interstitial voids of the web, similar to a draining device having a surface with apertures or other means for allowing fluids to drain, such as, but not limited to, a colander. Additionally, the fibrous web may be placed adjacent to such a draining device, such as, but not limited to a colander, and then food may be placed on top of the web, thereby allowing fluids such as, but not limited to, water or other aqueous liquids to pass through the web and the draining device. Furthermore, the fluids that pass through the web in this manner, with or without the use of a draining device, may be collected and used for foods, such as, but not limited to, making flavorful low fat gravies and sauces.

The fibrous web may be used in a manner such that it is in oil communication with the grease of the food but not in contact with the food. For example, the cooking container may be tipped to one side so that the grease collects on that one side. Then, the fibrous web may be placed on that side of the pan for absorption. It is also beneficial, but not required, to use a utensil to keep the food in a position other than the one side of the pan that is collecting the grease during tipping of the pan. Another example includes using the fibrous web of the instant invention as a "spatter shield" to prevent splattering from the cooking pan onto a stovetop, microwave, or other surrounding areas. While other absorbent articles in the prior art may melt from contact with a cooking pan at high temperatures, the fibrous web of the instant invention may be placed above the food being prepared and even in contact with the cooking container during cooking. When used in this manner, the fibrous web may wholly or partially cover the cooking container to stop the grease from splattering outside the container. This eliminates the messy cleanup of the surrounding area. Another example includes using the fibrous web of the instant invention to absorb the residual grease left in a cooking container after cooking by wiping or cleaning the pan with the fibrous web. This is especially effective when the cooking pan is still hot and the grease has not solidified.

As mentioned above, the fibrous web may also be used in a microwave. One method is to use the product as a cover or splatter shield (as described above) in the microwave. Another method includes wrapping the food in the fibrous web during cooking in the microwave. This allows steam to safely escape while capturing the spattering grease. The foods are then able to crisp in the microwave because the removal of the grease from the food by the fibrous web helps to prevent the food from becoming soggy.

Additionally, the present invention includes a system comprising the fibrous web and information that will inform the consumer, by written or spoken words and/or by pictures, that use of the fibrous web will absorb grease. Accordingly, the use of packages in association with information that will inform the consumer, by words and/or by pictures, that use of the fibrous web will provide benefits such as, but not limited to, improved absorption of grease is important. The information can include, e.g., advertising in all of the usual media, as well as statements and icons on the package, or on the fibrous web itself, to inform the consumer of the unique grease removal capabilities. The information may be communicated only by verbal means, only by written means, only by pictorial means, or any combination thereof. Information can be provided in a form of written instructions placed on or in packaging for the fibrous web, on the fibrous web itself, or on a separate article (such as, but not limited to, a piece of paper) packaged with the fibrous web. Obviously, the information need not be included directly with the product to constitute a system within this aspect of the invention. That is, for example, if a fibrous web is sold and advertisements are communicated generally about the fibrous web, this would constitute a system of this invention.

Additionally, the webs of the present invention can be used for absorption of oil or hydrophilic liquids in a wide variety of other applications, and the above disclosure it is not meant to necessarily limit the use of the webs of the present invention to any specific uses.

Referring now in more detail to the figures, FIG. 1 illustrates a fibrous web 10 of the present invention having a horizontal planar dimensions demonstrated by axis x-x and y-y, and thickness, t, in the z-z axis. Web 10 has top surface 12, having a thin thermally bonded layer 13 and bottom surface 14 having a thin thermally bonded layer 15. FIG. 2 illustrates a cross sectional view of FIG. 1. FIGS. 1 and 2 are for illustrative purposes and are not intended to demonstrate actual scale.

Figure 4:
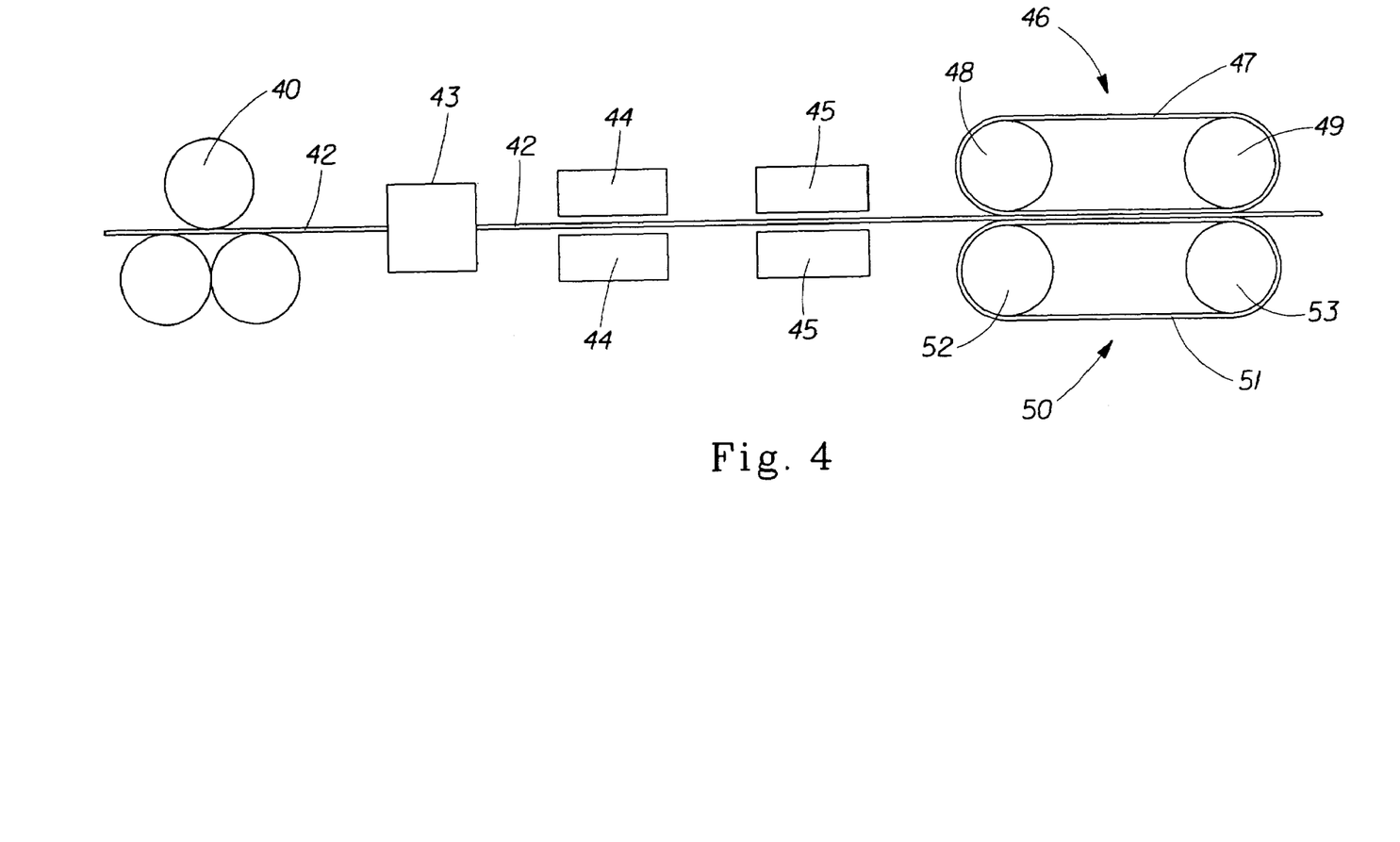
FIG. 4 is a flow diagram for a process for making fibrous webs according to the present invention.

FIG. 4 shows a flow chart of a process for making preferred fibrous webs. Fibers, not shown, enter carding machine 40 and are carded onto moving belt 42. Moving belt 42 transports the web to cross lapping machine 43, such as a festooning machine, which cross laps the carded web to increase basis weight and increase the ratio of cross direction strength to machine direction strength. Cross lapped web is then transported along belt 42 to a first needling station 44, where needling is applied to the top surface of the web only ("tacking"), and next to a second needling station 45 where needling is applied to both top and bottom surfaces of the web. Conventional needling equipment as is well known in the art can be used. After needling is completed, the web is thermally bonded on the top surface by thermal bonding machine 46 and on the bottom surface of the web by thermal bonding machine 50. Thermal bonding machines 46, 50, respectively have heated belts 47, 51 that travel around rolls 48, 49, 52, 53. Heated belts are heated to the desired thermal bonding temperature for the polymeric fibers. The fibers are heated to a temperature of about or greater than the Tg or Tm of the polymer to be melt bonded. In order to minimize densification, low or minimal pressure should be applied by the rolls 48, 49, 52, 53 and belts 47, 51. Preferably the gap between the belts 47, 51 is approximately the same as the thickness of the web, such that both belts contact the web, but do not excessively compress the web.

Test Procedures

Oil Absorbency Test Method

The Ambient Temperature Oil Absorbency, High Temperature (120 C) Oil Absorbency, and High Temperature (175 C) Oil Absorbency Values of the fibrous web is determined according to the test as follows. Ambient Temperature Oil Absorbency is determined at 22 C.

First, 48 ounces of CRISCO® vegetable oil (UPC 37000-00482, The Procter & Gamble Company, Cincinnati, Ohio) or equivalent are placed into a rectangular, flat bottom glass bowl having dimensions of 9.0 inches (22.9 cm) by 10.0 inches (25.4 cm) (e.g., PRYEX® Part No. 3140, Coming Inc. (Corning N.Y.), or equivalent). A stir bar is placed in the bowl containing the vegetable oil and the bowl is placed on a stirrer/hot plate (stirrer/hot plate Model PC 620, manufactured by Coming Inc., Corning, N.Y., or equivalent). The oil is heated with stirring until the oil reaches the desired temperature (120 C or 175 C). The target temperature for ambient absorbency (22 C) may be achieved by heating, or cooling, as may be appropriate. Throughout the test, temperature of the oil is controlled to within +/−3 C. degrees. A 10 cm by 10 cm square sample of the fibrous web is prepared and the mass is determined to within plus or minus 0.1 gram. The fibrous web is placed onto a 12.7 cm by 12.7 cm square stiff metal screen (0.6 mm diameter aluminum metal wire, rectangular weave woven screen with 1.27 cm spacing between wires measured wire center to center), lowered into the oil keeping the screen horizontal, kept submerged in the oil for 30 seconds, and removed from the oil keeping the screen horizontal. The screen is then held at a 45 degree angle for 3 to 5 seconds, returned to horizontal and allowed to drain for 15 seconds. The mass of the saturated fibrous web is then measured. The difference between the mass of the fibrous web before and after oil absorption is then calculated to determine the amount of oil absorbed. The Oil Absorbency Value is calculated by dividing the mass of oil absorbed by the original, pre-oil saturation mass of the 10 cm by 10 cm sample of the fibrous web and reported in units of gram per gram (g/g).

Linting Value

The Linting Value of the fibrous webs of the present invention is determined as follows. The webs to be tested and tape to be used in testing are to be pre-conditioned for 24 hours, and the test method is to be conducted, at between 20 C and 25 C, inclusive, and between 40% and 60% relative humidity, inclusive.

Adhesive tape (SCOTCH® masking tape, 3M234-1, manufactured by the Minnesota Manufacturing and Mining Company, St. Paul, Minn.) having a width of 2.54 cm is formed into adhesive test strips having a 2.5 cm×2.54 cm adhesive portion and a 1.25 cm×2.54 cm non-stick tab portion. The tab portion is formed by initially cutting the tape into 5.0 cm×2.54 cm strips, and then folding a portion of the tape over on itself with the adhesive sides of the folded portion of the tape facing each other. The mass of each test strip is measured to within plus or minus 1 mg.

A sample of fibrous web to be tested is placed on a horizontal level surface. An adhesive test strip is lightly (without application of normal force generated by the operator's hand) placed onto the web with the adhesive side of the test strip facing the web. The test strip should be place at least 1 cm away from the edge of the web. A 50 m wide, 4100 g roller is then rolled across the tape in the direction parallel to the short axis of the non-stick tab portion a total of four (4) times, starting with the non-stick tab portion of the test strip, then reversing direction, and repeating for a total of two (2) times in each direction. The roller should be rolled onto the test strip by placing the roller on the web or surrounding surface and rolling it onto the test strip. The roller should be rolled by pulling it by its handle with the handle maintained in a position horizontal to the surface so as to avoid operator-induced upward or downward forces. The roller is rolled at rate of about 1.4 cm/s (about 1 second of contact between the roll and the test strip per pass). No portion of the roller should extend beyond the edge of the web when it is being rolled over the test strip. The test strip is removed from the web using one hand to pull the test strip by the non-stick tab directly upward (perpendicular to the surface) with even force applied over a period of 2 seconds while holding the web down along both sides of the test strip that are parallel to the short axis of the no-stick tab (i.e., parallel with the direction the test strip is peeled from the web). The mass of the linted test strip is measured to within +/−1 mg. The amount of lint adhered to the test strip is calculated by subtracting the original mass of the test strip from the mass of the linted test strip. The test is repeated 11 more times, for a total of 12 times for each product. The average is calculated and reported as the Linting Value in units of mg.

Caliper, Density and Basis Weight Methods

All caliper, density, and basis weight measurements of the webs of the present invention should be measured according to the following methods.

Web materials to be measured should be pre-conditioned for 24 hours at 20 C to 25 C, inclusive, and 40% to 60% relative humidity, inclusive. Caliper is measured accurate to +/−0.001 mm at a pressure of 15.8 g/cm$^2$ applied over a 2.54 cm diameter circular flat bottom foot using a caliper dial indicator. The sample of web to be measured should be large enough to completely cover the area of the flat bottom foot. A balance to be used should be accurate to +/−0.01 g.

Procedure: Cut web sample to desired size and place on a flat anvil surface of the caliper dial indicator stand. Determine caliper using the caliper dial indicator (such as a Model ID C12E Electronic Dial Indicator from Mitutoyo Corp., Kanagawa, Japan, or equivalent). Measure mass of the web sample. Calculate density as (sample mass)/[(area of top surface of sample)×(caliper)]. Basis weight can determined by multiplying density by caliper.

Although particular versions and embodiments of the present invention have been shown and described, various modifications can be made to this absorbent fibrous web without departing from the teachings of the present invention. The terms used in describing the invention are used in their descriptive sense and not as terms of limitation, it being intended that all equivalents thereof be included within the scope of the claims.

What is claimed is:

1. A method for absorbing oil from food, comprising placing a web in oil communication with food during preparation, transport, or storage of said food, wherein: said web comprises synthetic fibers, a top surface, and a bottom surface; fibers of at least one of said top surface and said bottom surface are surface bonded; said web having a center region wherein said fibers are not thermally bonded to one another, a thickness of at least about 2 mm, a basis weight of from about 100 g/m$^2$ to about 500 g/m$^2$, and an Ambient Temperature (22 C) Oil Absorbency of about 7 g/g or greater.

2. A method as in claim 1, wherein said web is applied to food prior to, during, or subsequent to cooking.

3. A method as in claim 1, wherein said web has a density of about 100 g/cm$^3$ or less.

4. A method as in claim 3, wherein said web has a Linting Value of about 6.6 mg/cm$^2$ or less.

5. A method as in claim 4, wherein said fibers of said web are entangled.

6. A method as in claim 5, wherein said fibers are entangled by needling or hydroentangling.

7. A method as in claim 6, wherein said top surface and said bottom surface are thermally bonded.

8. A method as in claim 7, wherein said needling or entangling comprises a tacking stage wherein needling or hydroentangling is applied to at least one of a top surface and a bottom surface of said web, and a final stage wherein needling or hydroentangling is applied to both of said top and bottom surfaces of said web.

9. A method as in claim 1, wherein said fibers are bicomponent fibers.

10. A method as in claim 6, wherein said web has a Linting Value of about 3.3 mg/cm$^2$ or less.

* * * * *

UNITED STATES PATENT AND TRADEMARK OFFICE
CERTIFICATE OF CORRECTION

PATENT NO. : 7,128,789 B2 Page 1 of 1
APPLICATION NO. : 10/390214
DATED : March 17, 2003
INVENTOR(S) : William Robert Ouellette et al.

It is certified that error appears in the above-identified patent and that said Letters Patent is hereby corrected as shown below:

*Column 2, line 42, delete "Tinting"" and insert therefor -- linting --.*
*Column 7, line 40, delete "Tinting"" and insert therefor -- linting --.*
*Column 11, lines 60 and 64, delete "Coming" and insert therefor -- Corning --.*

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

PATENT NO.        : 7,128,789 B2                                          Page 1 of 1
APPLICATION NO. : 10/390214
DATED             : October 31, 2006
INVENTOR(S)       : William Robert Ouellette et al.

It is certified that error appears in the above-identified patent and that said Letters Patent is hereby corrected as shown below:

*Column 2, line 42, delete "Tinting"" and insert therefor -- linting --.*
*Column 7, line 40, delete "Tinting"" and insert therefor -- linting --.*
*Column 11, lines 60 and 64, delete "Coming" and insert therefor -- Corning --.*

This certificate supersedes Certificate of Correction issued January 9, 2007.

Signed and Sealed this

Sixth Day of February, 2007

JON W. DUDAS
*Director of the United States Patent and Trademark Office*